(12) United States Patent
Smith et al.

(10) Patent No.: US 7,030,536 B2
(45) Date of Patent: Apr. 18, 2006

(54) MICROMACHINED ULTRASONIC TRANSDUCER CELLS HAVING COMPLIANT SUPPORT STRUCTURE

(75) Inventors: Lowell Scott Smith, Niskayuna, NY (US); Douglas G. Wildes, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 116 days.

(21) Appl. No.: 10/748,920

(22) Filed: Dec. 29, 2003

(65) Prior Publication Data

US 2005/0146240 A1 Jul. 7, 2005

(51) Int. Cl.
*H02N 1/00* (2006.01)

(52) U.S. Cl. .............. 310/309; 600/459; 367/163; 367/174; 381/174

(58) Field of Classification Search .............. 310/309; 73/514.32; 600/459; 359/291; 367/163, 367/181, 174; 381/191, 174
See application file for complete search history.

(56) References Cited

U.S. PATENT DOCUMENTS

| | | | |
|---|---|---|---|
| 5,146,435 A | 9/1992 | Bernstein | 367/181 |
| 5,450,498 A * | 9/1995 | Whitehead | 381/191 |
| 5,452,268 A | 9/1995 | Bernstein | 367/181 |
| 5,527,741 A | 6/1996 | Cole et al. | 437/209 |
| 5,569,968 A | 10/1996 | Lal et al. | 310/322 |
| 5,596,222 A | 1/1997 | Bernstein | 257/620 |
| 5,600,610 A * | 2/1997 | Hill et al. | 367/181 |
| 5,619,476 A | 4/1997 | Haller et al. | 367/181 |
| 5,684,324 A | 11/1997 | Bernstein | 257/415 |
| 5,870,351 A | 2/1999 | Ladabaum et al. | 367/163 |
| 5,894,452 A | 4/1999 | Ladabaum et al. | 367/163 |
| 5,982,709 A | 11/1999 | Ladabaum et al. | 367/170 |
| 6,004,832 A | 12/1999 | Haller et al. | 438/50 |
| 6,025,951 A * | 2/2000 | Swart et al. | 359/245 |
| 6,038,928 A | 3/2000 | Maluf et al. | 73/724 |
| 6,140,143 A | 10/2000 | Christel et al. | 438/53 |
| 6,239,482 B1 | 5/2001 | Fillion et al. | 257/678 |
| 6,242,282 B1 | 6/2001 | Fillion et al. | 438/106 |
| 6,262,946 B1 | 7/2001 | Khuri-Yakub et al. | 367/181 |
| 6,271,620 B1 | 8/2001 | Ladabaum | 310/334 |
| 6,292,435 B1 | 9/2001 | Savord et al. | 367/138 |
| 6,295,247 B1 | 9/2001 | Khuri-Yakub et al. | 367/140 |
| 6,320,239 B1 | 11/2001 | Eccardt et al. | 257/415 |
| 6,328,696 B1 | 12/2001 | Fraser | 600/459 |
| 6,328,697 B1 | 12/2001 | Fraser | 600/459 |
| 6,359,367 B1 | 3/2002 | Sumanaweera et al. | 310/309 |
| 6,381,197 B1 | 4/2002 | Savord et al. | 367/178 |
| 6,430,109 B1 | 8/2002 | Khuri-Yakub et al. | 367/181 |
| 6,443,901 B1 * | 9/2002 | Fraser | 600/459 |
| 6,445,109 B1 | 9/2002 | Percin et al. | 310/324 |
| 6,474,786 B1 | 11/2002 | Percin et al. | 347/54 |
| 6,493,288 B1 | 12/2002 | Khuri-Yakub et al. | 367/81 |

(Continued)

FOREIGN PATENT DOCUMENTS

GB 2076970 * 12/1981

(Continued)

*Primary Examiner*—Karl Tamai
(74) *Attorney, Agent, or Firm*—Fletcher Yoder

(57) ABSTRACT

A micromachined ultrasonic transducer array comprising a multiplicity of cMUT cells built on a substrate. Each cMUT cell comprises a compliant support structure built on the substrate, a membrane supported over a cavity by the compliant support structure, a first electrode supported by the membrane, and a second electrode that forms a capacitor with the first electrode, the cavity being disposed between the first and second electrodes. The compliant support structure uncouples the non-membrane outer surface of each cMUT cell from the supporting substrate.

15 Claims, 4 Drawing Sheets

U.S. PATENT DOCUMENTS

| | | | |
|---|---|---|---|
| 6,562,650 B1 | 5/2003 | Ladabaum | 438/53 |
| 6,571,445 B1 | 6/2003 | Ladabaum | 29/25.35 |
| 6,676,602 B1 | 1/2004 | Barnes et al. | 600/443 |
| 6,735,008 B1* | 5/2004 | Brophy et al. | 359/245 |
| 6,785,039 B1* | 8/2004 | Wendland, Jr. | 359/290 |
| 6,836,029 B1* | 12/2004 | Greenberg et al. | 307/139 |
| 2001/0043028 A1 | 11/2001 | Ladabaum | 310/334 |
| 2001/0043029 A1 | 11/2001 | Ladabaum | 310/334 |
| 2002/0048219 A1 | 4/2002 | Ladabaum et al. | 367/162 |
| 2002/0125790 A1* | 9/2002 | Horning et al. | 310/309 |
| 2003/0048698 A1 | 3/2003 | Barnes et al. | 367/181 |
| 2003/0103412 A1 | 6/2003 | Ladabaum et al. | 367/162 |
| 2005/0146240 A1* | 7/2005 | Smith et al. | 310/309 |

FOREIGN PATENT DOCUMENTS

| | | |
|---|---|---|
| WO | WO 00/5001 | 2/2000 |
| WO | WO 01/23105 A1 | 4/2001 |
| WO | WO 01/97559 A2 | 12/2001 |
| WO | WO 01/97559 A3 | 12/2001 |
| WO | WO 01/97562 A2 | 12/2001 |
| WO | WO 01/97562 A3 | 12/2001 |
| WO | WO 02/39782 A2 | 5/2002 |
| WO | WO 02/039782 A3 | 5/2002 |
| WO | WO 03/051530 A1 | 6/2003 |
| WO | WO 03/059170 A1 | 7/2003 |

* cited by examiner

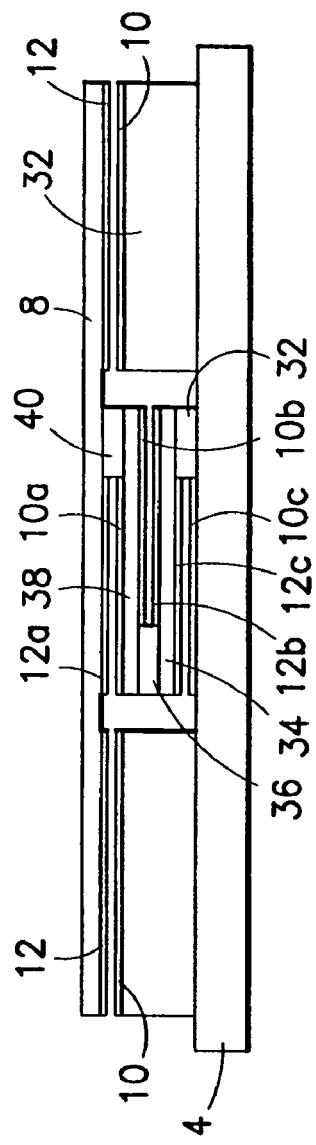
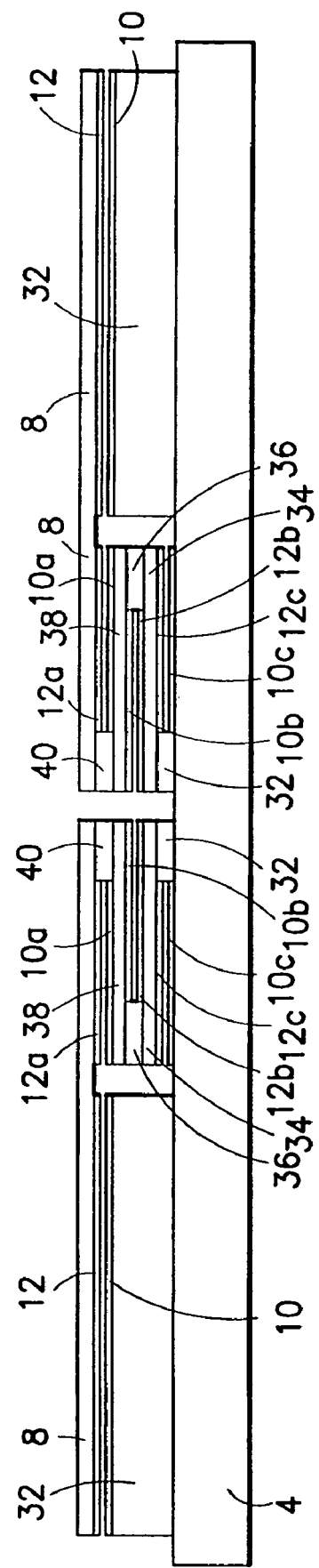

MICROMACHINED ULTRASONIC TRANSDUCER CELLS HAVING COMPLIANT SUPPORT STRUCTURE

BACKGROUND OF THE INVENTION

This invention generally relates to any micromachined structure in which it is desirable to isolate the effect of a mechanical stimulus on a front surface to the mechanical forces transmitted to bulk substrate. The invention is effective for both surface and bulk micromachining.

Recently semiconductor processes have been used to manufacture ultrasonic transducers of a type known as micromachined ultrasonic transducers (MUTs), which may be of the capacitive (cMUT) or piezoelectric (PMUT) variety. cMUTs are tiny diaphragm-like devices with electrodes that convert the sound vibration of a received ultrasound signal into a modulated capacitance. For transmission the capacitive charge is modulated to vibrate the diaphragm of the device and thereby transmit a sound wave.

One advantage of MUTs is that they can be made using semiconductor fabrication processes, such as microfabrication processes grouped under the heading "micromachining". As explained in U.S. Pat. No. 6,359,367:

Micromachining is the formation of microscopic structures using a combination or subset of (A) Patterning tools (generally lithography such as projection-aligners or wafer-steppers), and (B) Deposition tools such as PVD (physical vapor deposition), CVD (chemical vapor deposition), LPCVD (low-pressure chemical vapor deposition), PECVD (plasma chemical vapor deposition), and (C) Etching tools such as wet-chemical etching, plasma-etching, ion-milling, sputter-etching or laser-etching. Micromachining is typically performed on substrates or wafers made of silicon, glass, sapphire or ceramic. Such substrates or wafers are generally very flat and smooth and have lateral dimensions in inches. They are usually processed as groups in cassettes as they travel from process tool to process tool. Each substrate can advantageously (but not necessarily) incorporate numerous copies of the product. There are two generic types of micromachining . . . 1) Bulk micromachining wherein the wafer or substrate has large portions of its thickness sculptured, and 2) Surface micromachining wherein the sculpturing is generally limited to the surface, and particularly to thin deposited films on the surface. The micromachining definition used herein includes the use of conventional or known micromachinable materials including silicon, sapphire, glass materials of all types, polymers (such as polyimide), polysilicon, silicon nitride, silicon oxynitride, thin film metals such as aluminum alloys, copper alloys and tungsten, spin-on-glasses (SOGs), implantable or diffused dopants and grown films such as silicon oxides and nitrides.

The same definition of micromachining is adopted herein. The systems resulting from such micromachining processes are typically referred to as "micromachined electro-mechanical systems (MEMS).

Conventional cMUTs resemble tiny drums that are "beat" electrostatically. The drumhead vibrates to both emit and receive ultrasonic waves. A cMUT probe consists of an array of many elements, each element comprising a respective multiplicity of individual cMUT cells.

A typical cMUT cell comprises a thin membrane (made, e.g., of silicon or silicon nitride) with an overlying metal electrode, suspended over a cavity (usually evacuated) formed over or in a silicon substrate. A bottom electrode is formed in or on the silicon substrate. Groups of cMUT cells may be electrically connected by hard wiring the top electrodes to each other. The driving force for the deflection of the membrane is the electrostatic attraction between the top and bottom electrodes when a voltage is impressed across them. If an alternating voltage drives the membrane, significant ultrasound generation results. Conversely, if the membrane is biased appropriately and subjected to incoming ultrasonic waves, significant detection currents are generated. Typical thicknesses of the membrane and the cavity gap are on the order of 0.5 micron. The lateral dimensions of the cMUT cell range from 100 to 30 microns for cMUT array operating frequencies of 2 to 15 MHz, respectively.

Most cMUTs are comprised of many small drumhead membranes tiled together. Typically, the membranes are supported by rigid walls around and between the individual cMUT cells. This rigid support structure between the membranes reduces the effective area of the transducer array and may contribute to unwanted structural resonances and crosstalk between transducer elements. The deflection of the drumhead is non-uniform, largest in the center and zero at the edges.

The transduction performance of each cMUT cell depends on the distance between the electrodes, the compliance of the supports, and the stiffness of the membrane (as well as factors such as the density and Poisson's ratio of the membrane). With stiff supports and a flexible membrane, the structure behaves as a drumhead, i.e., a traditional cMUT. There is a need for new cMUT structures that improve upon the performance of the conventional cMUT array.

BRIEF DESCRIPTION OF THE INVENTION

The present invention is directed to cMUT cells that have a compliant support structure. The compliant support structure uncouples the non-membrane outer surface of each cMUT cell from the supporting substrate. While conventional ultrasound cMUTs are now constructed with small diaphragms (of order 100 microns in diameter), the approach proposed herein should allow the fabrication of much larger structures, in the millimeter range, while still remaining sensitive to a wide range of frequencies.

In combination with a relatively stiff membrane, the compliant support structure: 1) allows greater membrane displacement per unit incident sound pressure or per unit applied electrical excitation, thus providing a more effective transformation between electrical signals and ultrasound; 2) allows more uniform membrane displacement, a large-area piston-like displacement instead of many small-area drumheads; 3) increases the effective area of the transducer by eliminating the relatively rigid, non-displacing supporting walls between the many cMUT cells of a conventional transducer element or element; and 4) reduces the coupling between the sound field and the cMUT transducer substrate, thereby reducing crosstalk and the effects of structural resonances in the substrate.

Compliant support structures can be formed by surface or bulk micromachining. Examples of surface-micromachined compliant support structures are disclosed herein. In bulk micromachining, compliant support structures can be formed by removing portions of the substrate (i.e., first wafer) to form cavities and then bonding a second wafer, which incorporates the membranes and other removable material, to the first wafer, which the membranes overlying the cavities formed in the bulk substrate.

One aspect of the invention is a device comprising a mechanical structure micromachined in or on a substrate, the mechanical structure comprising a compliant support structure, and a member supported by the compliant support structure, wherein the compliant support structure changes size or shape during movement of the member. In one embodiment, the member comprises a membrane and a first electrode supported by the membrane, and further comprising a second electrode disposed at a distance from the first electrode to form a capacitor with a cavity disposed therebetween. In this case, the compliant support structure changes size or shape during compression/expansion of the membrane.

Another aspect of the invention is a cMUT cell array comprising a compliant support structure, a first membrane supported over a first cavity by the compliant support structure, a first electrode supported by the first membrane, a second electrode that forms a capacitor with the first electrode, the first cavity being disposed between the first and second electrodes, a second membrane supported over a second cavity by the compliant support structure, a third electrode supported by the second membrane and electrically connected to the first electrode, and a fourth electrode electrically connected to the second electrode and arranged to form a capacitor with the third electrode, the second cavity being disposed between the third and fourth electrodes, and a portion of the compliant support structure being disposed between the first and second cavities.

A further aspect of the invention is a method of manufacturing a support structure for supporting a membrane of a cMUT cell above a substrate, comprising the following steps: (a) depositing a first layer of a first permanent material having a first thickness above a first region of the substrate having a first ring-like shape; (b) depositing a first layer of a removable material having the first thickness above a second region of the substrate having a second ring-like shape and over a third region of the substrate having a third ring-like shape, the first region being contiguous with the second region, and the second region being contiguous with the third region; (c) depositing a first layer of a second permanent material having a second thickness above the first layers in an area overlying the first through third regions; (d) depositing a second layer of the first permanent material having a third thickness above the first layer of the second permanent material in an area overlying the third region; (e) depositing a second layer of the removable material having the third thickness above the first layer of the second permanent material in an area overlying the first and second regions; (f) depositing a layer of membrane material above the second layer of the first permanent material and the second layer of removable material, the layer of membrane material overlying the first through third regions and a fourth region surrounded by the first through third regions; and (g) removing the removable material without removing the first and second permanent materials or the membrane material, step (g) being performed after steps (a) through (f).

Yet another aspect of the invention is a device comprising a mechanical structure micromachined in or on a substrate, the mechanical structure comprising a plurality of compliant support structures, and a member supported by the plurality of compliant support structures, wherein the compliant support structures change size or shape during movement of the member. In another embodiment, the member comprises a membrane, a first electrode supported by the membrane, and a second electrode disposed at a distance from the first electrode to form a capacitor with a cavity disposed therebetween. In this case, the compliant support structures change size or shape during compression/expansion of the membrane.

A further aspect of the invention is a method of manufacturing a support structure for supporting a membrane of a cMUT cell above a substrate, comprising the following steps: (a) depositing a first layer of a first permanent material having a first thickness above a first region of the substrate; (b) depositing a first layer of a removable material having the first thickness above a second region of the substrate, the first region being contiguous with the second region; (c) depositing a layer of a second permanent material having a second thickness above the first layers in an area overlying the first and second regions; (d) depositing a second layer of the first permanent material having a third thickness above the first layer of the second permanent material in an area overlying a first portion of the second region; (e) depositing a second layer of the removable material having the third thickness above the layer of the second permanent material in an area overlying the first region and a second portion of the second region, the first and second portions of the second region being non-overlapping; (f) depositing a layer of membrane material above the second layer of the first permanent material and the second layer of removable material, the layer of membrane material overlying the first and second regions and a third region outside the first and second regions; and (g) removing the removable material without removing the first and second permanent materials or the membrane material, step (g) being performed after steps (a) through (f).

Yet another aspect of the invention is a transducer element comprising: a membrane; a rigid perimeter wall, the perimeter of the membrane being attached to the rigid perimeter wall; and a plurality of transducer cells disposed within the rigid perimeter wall, each of the cells comprising a respective compliant support structure connected to a respective portion of the membrane.

Other aspects of the invention are disclosed and claimed below.

BRIEF DESCRIPTION OF THE DRAWINGS

FIG. 7 is a drawing showing a sectional view of a portion of a cMUT cell array in accordance with a fourth embodiment of the invention.

FIG. 8 is a drawing showing a sectional view of portions of adjacent cMUT elements or elements in accordance with the embodiment depicted in FIG. 7.

Reference will now be made to the drawings in which similar elements in different drawings bear the same reference numerals.

DETAILED DESCRIPTION OF THE INVENTION

Figure 1:
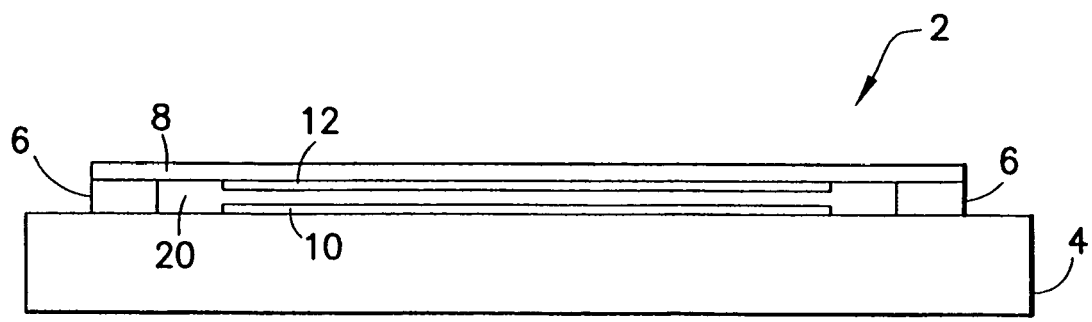
FIG. 1 is a drawing showing a cross-sectional view of a typical cMUT cell.

Capacitive micromachined ultrasound transducers (cMUTs) are silicon-based devices that comprise small (e.g., 50 μm) capacitive "drumheads" or cells that can transmit and receive ultrasound energy. Referring to FIG. 1, a typical MUT transducer cell 2 is shown in cross section. An array of such MUT transducer cells is typically fabricated in (bulk micromachining) or on (surface micromachining) a substrate 4, such as a silicon wafer. For each MUT transducer cell, a thin flexible membrane or diaphragm 8 is suspended above a cavity 20. The membrane 8 is supported on its periphery by an insulating support 6. The insulating support 6 typically comprises a relatively rigid vertical wall that encloses the cavity 20 underneath the membrane 8. One cMUT cell typically shares sections of the wall with its neighbors. The cavity 20 between the membrane 8 and the substrate 4 may be air- or gas-filled or wholly or partially evacuated. A film or layer of conductive material, such as aluminum alloy or other suitable conductive material, forms an electrode 12 on the membrane 8, and another film or layer made of conductive material forms an electrode 10 on the substrate 4. Alternatively, the substrate can be doped to form the bottom electrode. Also the electrode 12 can be on top of membrane 8 rather than on the bottom as shown in FIG. 1.

The two electrodes 10 and 12, separated by the cavity 20, form a capacitance. When an impinging acoustic signal causes the membrane 8 to vibrate, the variation in the capacitance can be detected using associated electronics (not shown in FIG. 1), thereby transducing the acoustic signal into an electrical signal. Conversely, an AC signal applied to one of the electrodes will modulate the charge on the electrode, which in turn causes a modulation in the capacitive force between the electrodes, the latter causing the diaphragm to move and thereby transmit an acoustic signal.

In operation, the cMUT cell typically has a dc bias voltage $V_{bias}$ that is significantly higher than the time-varying voltage v(t) applied across the electrodes. The bias attracts the top electrode toward the bottom through coulombic force. In this heavily biased case, the cMUT drumheads experience a membrane displacement u given as follows:

$$u(t) \approx \frac{\varepsilon}{d^2} * V_{bias} * v(t) \quad (1)$$

where d is the distance between the electrodes or plates of the capacitor, and a is the effective dielectric constant of the cell. The sensitivity of the cMUT cell has been found to be the greatest when the bias voltage is high and electrodes are closer together.

Due to the micron-size dimensions of a typical cMUT cell, numerous cMUT cells are typically fabricated in close proximity to form a single transducer element. The individual cells can have round, rectangular, hexagonal, or other peripheral shapes. Hexagonal shapes provide dense packing of the cMUT cells of a transducer element.

Figure 2:
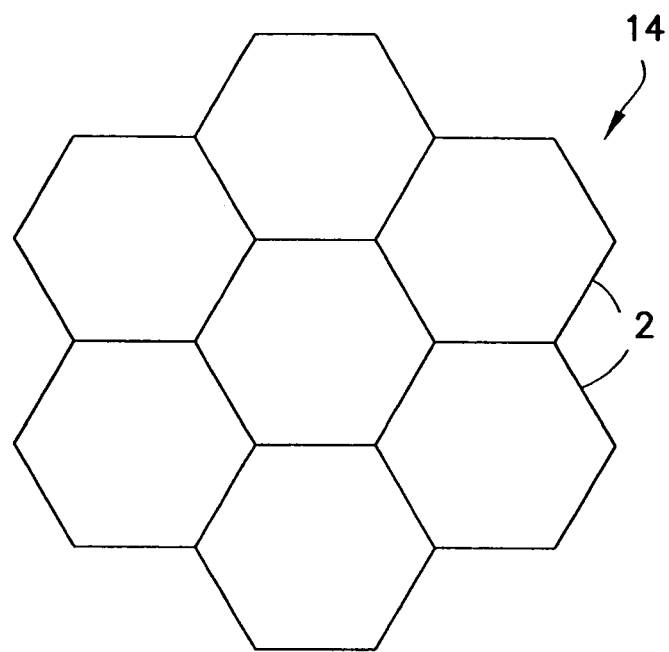
FIG. 2 is a drawing showing a "daisy" element formed from seven hexagonal cMUT cells having their top and bottom electrodes respectively hard-wired together.

For the purpose of illustration, FIG. 2 shows a "daisy" element 14 made up of seven hexagonal cMUT cells 2: a central cell surrounded by a ring of six cells, each cell in the ring being contiguous with a respective side of the central cell and the adjoining cells in the ring. The top electrodes of each cell of the element are hardwired together. The bottom electrodes of each cell are also electrically connected to each other, forming a seven-times-larger capacitive element.

Figure 3:
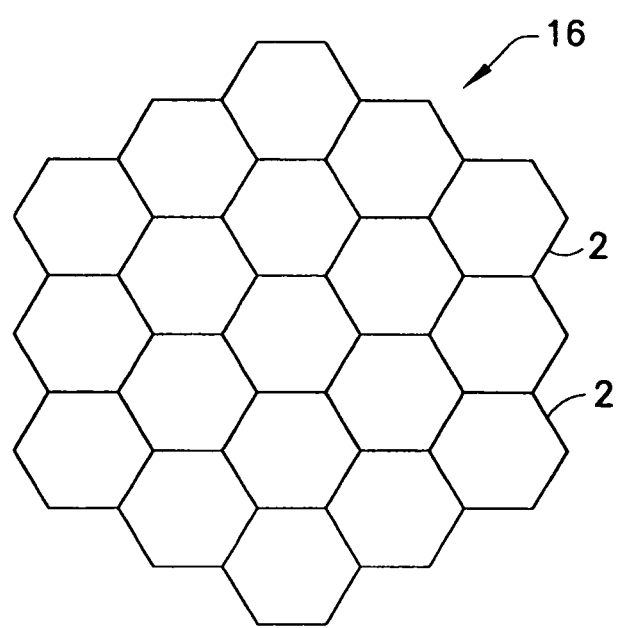
FIG. 3 is a drawing showing a "hexagonal" element formed from 19 hexagonal cMUT cells having their top and bottom electrodes respectively hard-wired together.

An alternative "hexagonal" element 16 is shown in FIG. 3 and is made up of 19 cMUT cells. The top electrodes of the cells in each group are hardwired together; similarly, the bottom electrodes of the cells in each group are connected, thus forming a larger capacitive element. Since the MUT cell can be made very small, it is possible to achieve very fine-pitch mosaic arrays.

Figure 4:
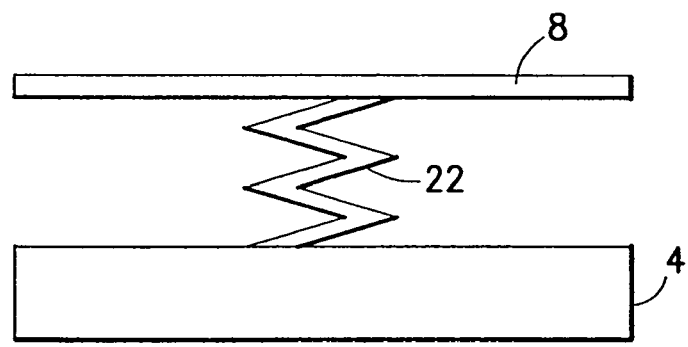
FIG. 4 is a drawing showing a sectional view of a portion of a cMUT cell array in accordance with one embodiment of the invention.

FIG. 4 shows a compliant structure in the form of a bellows 22 for supporting membranes 8 in a cMUT cell array. The compliant structure may be built on a substrate 4, such as a silicon wafer, or on top of a layer of CMOS electronics, as will be described in more detail later with reference to FIG. 9. In the case of the hexagonal patterns depicted in FIGS. 2 and 3, the compliant structure of each element would be built in accordance with the same pattern, so that interior cells would share respective sections of the hexagonal wall with its six neighbors. It should be appreciated that FIG. 4 basically shows only a section through one portion of the compliant structure 22. The membranes 8 may be formed by a continuous layer of relatively stiff membrane material that extends over a multiplicity of cells making up an element, so that the membranes of adjacent cells move in unison in a piston-like manner during vibration. The bellows 22 reduces coupling (i.e., sound transmission) between the membrane and the substrate. Also, the bellows may seal the perimeter of the membrane, separating the gas or vacuum inside the cMUT cell from the acoustic medium outside.

Alternatively, the compliant supports disclosed herein for each cMUT cell may be separate of the perimeter wall of the element consisting of a group of such cMUT cells. In this case, the compliant supports are not involved in sealing. Referring to FIG. 2, this represents an element made of seven individual cells. Each cell membrane is attached to the cell perimeter, whatever that structure may be. The perimeter wall for the element need not have the same structure as the perimeter wall for a cell. In particular, there are walls that are interior to the element that may look like the structure shown in FIG. 4, while the element perimeter wall is rigid. A drum head has many modes of vibration. The lowest-frequency mode of vibration is circularly symmetric and a single half wavelength covers the whole diameter. That is approximately the most desirable mode for a cMUT cell. Higher-frequency modes can be symmetric with more wavelengths across the diameter, or have reduced symmetry. For example, vibrating with a node line across a diameter and the left side going up while the right side goes down. By using compliant interior walls, the low-frequency mode is retained for the individual cells while constraining the element vibrations to specific controlled combinations of the constituent cells. In particular, the motion is constrained to in-phase or coherent motion of the cells. Thus un-symmetric (unwanted) modes can be suppressed.

Figure 5:
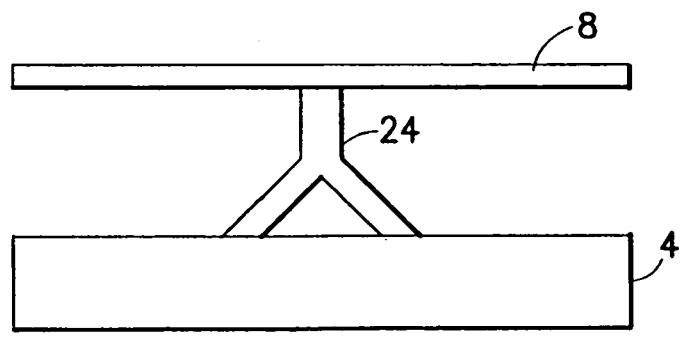
FIG. 5 is a drawing showing a sectional view of a portion of a cMUT cell array in accordance with another embodiment of the invention.

FIG. 5 shows a sectional view of a portion of a cMUT cell array in accordance with another embodiment of the invention. In this case, again the compliant structure is a closed wall that seals the inside of the cell from the external acoustic medium. In this embodiment, the profile of the compliant support structure is an inverted Y, i.e., the structure comprises an arch at the base in the shape of an inverted V and a wall extending upward from the peak of the arch. The membranes 8 of adjacent cells are supported by the top of that wall. Again the membrane layer 8 may be relatively stiff while the support structure is relatively compliant, allowing the membranes to vibrate in a piston-like manner. A change from a simple vertical wall to a structured support can shift wall and substrate resonances out of the frequency band in which the transducer will be used.

Figure 6:
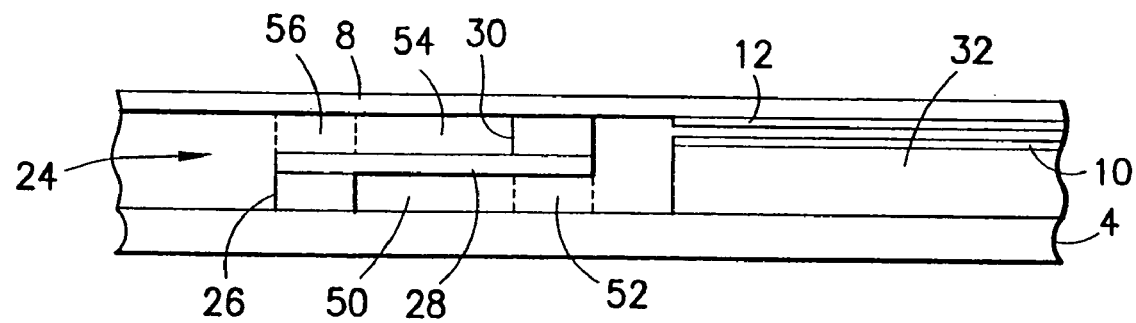
FIG. 6 is a drawing showing a sectional view of a portion of a cMUT cell array in accordance with a further embodiment of the invention.

FIG. 6 shows a sectional view of a portion of a cMUT cell array in accordance with another embodiment of the invention. Portions of two adjacent cMUT cells are depicted. This structure comprises a substrate 4 on which the cMUT cells are fabricated using MEMS techniques. The membranes 8 are supported by a compliant support structure having a cross section that resembles a cantilevered beam. This cantilevered beam construction increases the compliance of the membrane support and can be fabricated using MEMS processes. Each cell further comprises a pedestal 32 (the pedestal of the cell on the left-hand side in FIG. 6 is not shown) built on the substrate in the region that will underlie a respective cell membrane. A layer of metal 10 forms an electrode on the top surface of the pedestal 32, while another layer of metal 12 forms an electrode on the membrane 8. The electrodes 10 and 12 form a capacitor. The height of the pedestal under the membrane reduces the capacitor gap, thereby increasing sensitivity. The electrodes 10 and 12 are respectively hard-wired to the corresponding electrodes (not shown) of the adjacent cMUT cell.

The cantilevered beam compliant support structure partially shown in FIG. 6 comprises a ring-shaped (e.g., hexagonal) wall 26 built on the substrate 4, a ring-shaped (e.g., hexagonal) plate 28 supported along one periphery by the wall 26, and a ring-shaped (e.g., hexagonal) wall 30 built on the other periphery of the plate 28. The membrane 8 is supported by the wall 30, which may displace vertically due to the compliance of the plate 28. The plate 28 may be made of a material that is more compliant than the material that walls 26 and 30 are made of. If the membrane material is sufficiently stiff, then the membranes of adjacent cells may move in unison in a piston-like manner during vibration. The compliant plate 28 uncouples the wall 30 from the substrate 4. Again, the walls 26 and 30 and the plate 28 for each cell may form a closed structure that seals the inside of the cell from the outside.

The cMUT cell configuration partly shown in FIG. 6 can be fabricated using MEMS techniques in the following manner. A first layer of, e.g., silicon oxide or silicon nitride having a first thickness is deposited on a first region of the substrate having a first ring-like shape. This first layer of silicon oxide or silicon nitride will become the wall 26 in the final structure. Also a first layer of a removable (e.g., etchable) material having the first thickness is deposited on a second region of the substrate having a second ring-like shape and over a third region of said substrate having a third ring-like shape. The first region is contiguous with the second region, and the second region is contiguous with the third region. The respective spaces occupied by this removable material and overlying the aforementioned second and third regions on the substrate are indicated by dashed lines in FIG. 6 and are respectively designated by numerals 50 and 52. Thereafter, a layer of a compliant material having a second thickness is deposited on the aforementioned first layers in an area overlying the first through third regions. The compliant material may comprise silicon oxide or silicon nitride or a material having greater compliance. The layer of compliant material will become the plate 28 in the final product. In the next stage of microfabrication, a second layer of said silicon oxide or silicon nitride having a third thickness is deposited on the plate 28 in an area overlying the third region (i.e., overlying space 52). This second layer of silicon oxide or silicon nitride will become the wall 36 in the final structure. In addition, a second layer of the removable material having the third thickness is deposited on the plate 28 in spaces 56 and 54 overlying the first and second regions respectively.

In addition, the pedestal 32 is built atop a fourth region of the substrate that is surrounded by the aforementioned first through third regions. Then a first layer of metal is deposited on top of the pedestal, which layer will form the electrode 12 in the final structure. Then removable material is deposited on top of the metallized surface of the pedestal, as well as in the generally ring-shaped empty space that separates the pedestal from the surrounding compliant support structure. A second layer of metal is deposited on top of the layer of removable material that was deposited on top of electrode 12. The second layer of metal will form the electrode 10 in the final structure.

After all of the foregoing steps have been performed, a layer of membrane material is deposited on the fabricated structure. The membrane material covers the electrode 12, the wall 30 and the removable material that fills in the remaining spaces. Then the removable material is removed, e.g., by etching, leaving behind the micromachined structure seen in FIG. 6.

FIG. 7 shows a sectional view of a portion of a cMUT cell array in accordance with a further embodiment of the invention. Again portions of two adjacent cMUT cells are depicted. A compliant support structure having a cross section that resembles a double cantilevered beam is disposed between the respective pedestals 32 of the adjacent cells. This double cantilevered beam construction provides a compliant membrane support and can be fabricated using MEMS processes similar to those previously described herein. Again, the height of the respective pedestal under each membrane reduces the capacitor gap, thereby increasing sensitivity, while the electrodes 10 and 12 of one cMUT cell are respectively hard-wired to the corresponding electrodes of the adjacent cMUT cell.

The double cantilevered beam compliant support structure partially shown in FIG. 7 comprises a ring-shaped wall 32 built on the substrate 4, a ring-shaped plate 34 supported along one periphery by the wall 32, a ring-shaped wall 30 built on the other periphery of the plate 34, a ring-shaped plate 38 overlying the plate 34 and supported along one periphery by the wall 36 therebetween, and a ring-shaped wall 40 built on the other periphery of the plate 38. The membrane 8 is supported by the wall 40 and can displace vertically due to the compliance of the support structure. The plates 34 and 38 may be made of a material that is more compliant than the material that walls 32, 36 and 40 are made of. As previously discussed, if the membrane material is sufficiently stiff, then the membranes of adjacent cells may move in unison in a piston-like manner during vibration. The compliant plates 34 and 38 uncouple the wall 40 from the substrate 4. Also, the walls 32, 36 and 40 and the plate 34 and 38 for each may form a closed structure that seals the inside of the cell from the outside.

The embodiment shown in FIG. 7 further comprises a plurality of parallel-plate capacitors incorporated in the double cantilever beam support structure to provide additional change in capacitance for each gap during compression and expansion, thereby increasing sensitivity during reception. This enables the cantilevered compliant structure to also function as an electrostatic actuator. The first capacitor built into the compliant structure comprises an electrode 10a formed on the top surface of the plate 38 and an electrode 12a formed on the bottom surface of the membrane 8. Electrode 12a is hard-wired to one or both of electrodes 12, while electrode 10a is hard-wired to one or both of the electrodes 10. The second capacitor comprises an electrode 10b formed on the bottom surface of the plate 38 and an electrode 12b formed on the top surface of the plate 34. Electrode 12b can be hard-wired to electrode 12a, while electrode 10b can be hard-wired to electrode 10a. The third capacitor comprises an electrode 10c formed on the top surface of the substrate 4 and an electrode 12c formed on the bottom surface of the plate 34. Electrode 12c can be hard-wired to electrode 12b, while electrode 10c can be hard-wired to electrode 10b. Each of these capacitors will produce additional charge during compression/expansion of the compliant support. That charge is in addition to the charge produced by the electrodes 10 and 12 during compression/expansion. Similar capacitors could be added to the cantilever beam compliant structure shown in FIG. 6.

The cMUT cell configuration partly shown in FIG. 7 can be fabricated using the same MEMS techniques described for the manufacture of the embodiment shown in FIG. 6, with the following differences: (1) a second layer of compliant material is deposited to form plate 38; (2) a third layer of silicon oxide or silicon nitride is deposited to form the wall 40; (3) a third layer of removable material is deposited to form a third gap in the double cantilever beam structure; and (4) layers of metal are deposited on the top of each layer of removable material and on the top of each opposing surface before the respective layers of removable material are deposited. The order in which the various layers need to be deposited in dictated in large part by the order in which the various gaps and layers are stacked in the embodiment shown in FIG. 7.

FIG. 8 shows respective portions of adjacent cMUT elements or elements having the double cantilever beam compliant membrane support structure. This drawing differs from FIG. 7 in that the latter shows a portion of an internal wall shared by two adjacent cells of a element or element, while FIG. 8 shows respective portions of respective outer walls of cells of adjacent elements or elements. The compliant support structures shown in FIG. 8 lie along the outer periphery of each element or element, while the substantially identical compliant support structure shown in FIG. 7 lies in the interior of an element or element.

Each of the compliant membrane supports disclosed above has a closed structure that seals the perimeter of each cell, separating the gas or vacuum within each cMUT cell from the acoustic medium outside. Alternatively, the structures of the above-disclosed embodiments can be modified to provide apertures or gaps that allow free interchange of gas between the inside and outside of each cMUT cell.

Other implementations of compliant supports include "coil spring"-like structures arranged at multiple points to support the membrane; cantilever beams used as point supports; and cantilever beams used as line or edge supports. For example, instead of a compliant support structure in the form of a continuous ring having a cantilevered profile, the compliant support structure can be formed by building a multiplicity of spaced-apart structures having the same cantilevered profile, i.e., by fabricating only a plurality of sections of the continuous ring. In such cases, each cell membrane is supported at a plurality of discrete locations rather than along a continuous periphery. The same patterning, deposition and etching techniques can be used to build such support structures.

In accordance with an alternative embodiment, a plurality of compliant supports may be combined with a perimeter wall that supports the membrane and defines a cavity under the membrane. In this case the supports are placed within the perimeter of the wall, the plurality of compliant supports also serving to support respective displaceable portions of the membrane (i.e., portions not attached to the perimeter wall).

In accordance with a further variation, the compliant membrane support structure may be provided with a controlled aperture that allows fluid communication between the volume under the membrane and the outside medium or a reservoir volume. The size of the aperture, the properties of the gas or fluid under the membrane, and the volumes under the membrane, displaced by the membrane, and of the reservoir will strongly affect the damping of the membrane. Valves for fluid (gas or liquid) channels in MEMS are often constructed with diaphragm valves.

Figure 9:
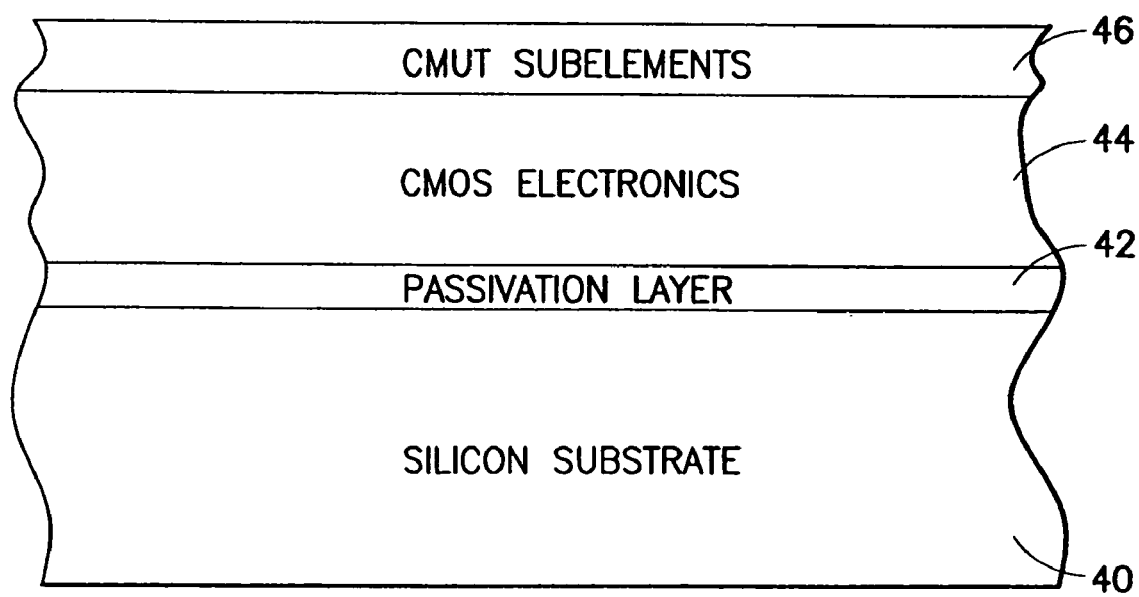
FIG. 9 is a drawing showing various layers of a micromachined structure that may incorporate any one of the compliant cMUT membrane support structures disclosed herein.

While the above-described embodiments may be built on a silicon substrate, they may also be built on a substrate that incorporates a layer of electronics, e.g., CMOS electronics. A high-bandwidth cMUT array can be integrated with conventional CMOS switches and preamplifier/buffer circuits on a silicon wafer to provide reconfigurable beam-forming elements. In such an integrated structure, the size of the transducer elements establishes the dimensions of the cells for the microelectronics in the silicon immediately below the array. Such an integrated structure is generally depicted in FIG. 9. A passivation layer 42 (made, e.g., of oxide) is placed on top of a silicon substrate 40. CMOS electronics 44 are fabricated on top of the passivation layer. Then the cMUT elements 46 are fabricated on top of the CMOS electronics. The cMUT elements 46 may be fabricated with compliant membrane support structures in accordance with any of the embodiments disclosed hereinabove.

One problem with most existing cMUTs is that they require high DC bias and high AC drive voltages. To take best advantage of cMUTs, it is desirable to integrate the transmit and receive electronics closely with the transducer devices. But high-voltage transistors require large area and are available from very few sources. The compliant supports may significantly reduce the voltage needed to drive the cMUTs and therefore greatly facilitate the integration of electronics with cMUTs for compact, high-performance ultrasound transducers.

The specific embodiments of the invention disclosed herein are micromachined ultrasonic transducer arrays. However, it should be understood that the invention generally relates to any micromachined structure in which it is desirable to isolate the effect of a mechanical stimulus on a front surface to the mechanical forces transmitted to bulk substrate.

Furthermore, while the invention has been described with reference to preferred embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

The invention claimed is:

1. A device comprising a mechanical structure micromachined in or on a substrate, said mechanical structure comprising a compliant support structure, and a member supported by said compliant support structure, wherein said compliant support structure changes size or shape during movement of said member, wherein said member comprises a membrane and a first electrode supported by said membrane, and further comprising a second electrode disposed at a distance from said first electrode to form a capacitor with a cavity disposed therebetween, wherein said compliant support structure changes size or shape during compression/expansion of said membrane, and wherein said compliant support structure comprises a first wall, a ring-like structure having an inner peripheral portion and an outer peripheral portion, one of said inner and outer peripheral portions being built on said first wall, and a second wall built on the other of said inner and outer peripheral portions and connected to said membrane.

2. The device as recited in claim 1, further comprising a pedestal, said second electrode being supported by said pedestal.

3. The device as recited in claim 1, further comprising a third electrode formed on a surface of said ring-like structure.

4. The device as recited in claim 3, further comprising a fourth electrode formed on a surface of said membrane and forming a capacitor with said third electrode.

5. The device as recited in claim 3, further comprising a fourth electrode formed on a surface of said substrate and forming a capacitor with said third electrode.

6. The device as recited in claim 1, wherein said compliant support structure in cross section resembles a cantilevered beam.

7. A cMUT cell comprising a substrate, a plurality of compliant support structures, a membrane supported over a cavity by said compliant support structures, a first electrode supported by said membrane, and a second electrode that forms a capacitor with said first electrode, said cavity being disposed between said first and second electrodes, wherein each of said compliant support structures change size or shape during compression/expansion of said membrane, wherein said member comprises a membrane and a first electrode supported by said membrane, and further comprising a second electrode disposed at a distance from said first electrode to form a capacitor with a cavity disposed therebetween, wherein said compliant support structure changes size or shape during compression/expansion of said membrane, and wherein said compliant support structure comprises a first wall, a ring-like structure having an inner peripheral portion and an outer peripheral portion, one of said inner and outer peripheral portions being built on said first wall, and a second wall built on the other of said inner and outer peripheral portions and connected to said membrane.

8. The cMUT cell as recited in claim 7, wherein said shape is a cantilever beam.

9. The cMUT cell as recited in claim 7, wherein said shape is an arch.

10. The cMUT cell as recited in claim 7, wherein said shape is a coil.

11. A device comprising a mechanical structure micromachined in or on a substrate, said mechanical structure comprising a compliant support structure, and a member supported by said compliant support structure, wherein said compliant support structure changes size or shape during movement of said member, wherein said member comprises a membrane and a first electrode supported by said membrane, and further comprising a second electrode disposed at a distance from said first electrode to form a capacitor with a cavity disposed therebetween, wherein said compliant support structure changes size or shape during compression/expansion of said membrane, and wherein said compliant support structure comprises:
  a first wall;
  a first ring-like structure having an inner peripheral portion and an outer peripheral portion, one of said inner and outer peripheral portions of said first ring-like structure being built on said first wall;
  a second wall built on the other of said inner and outer peripheral portions of said first ring-like structure;
  a second ring-like structure overlying said first ring-like structure and having an inner peripheral portion and an outer peripheral portion, one of said inner and outer peripheral portions of said second ring-like structure being built on said second wall; and
  a third wall built on the other of said inner and outer peripheral portions of said second ring-like structure and connected to said membrane.

12. The device as recited in claim 11, further comprising a third electrode formed on a surface of one of said first and second ring-like structures.

13. The device as recited in claim 11, wherein said compliant support structure in cross section resembles a double cantilevered beam.

14. The device as recited in claim 11, wherein the compliance of said compliant support structure and the stiffness of said membrane are selected so that said membrane vibrates in a piston-like manner.

15. A cMUT cell comprising a substrate, a plurality of compliant support structures, a membrane supported over a cavity by said compliant support structures, a first electrode supported by said membrane, and a second electrode that forms a capacitor with said first electrode, said cavity being disposed between said first and second electrodes, wherein each of said compliant support structures change size or shape during compression/expansion of said membrane, wherein said member comprises a membrane and a first electrode supported by said membrane, and further comprising a second electrode disposed at a distance from said first electrode to form a capacitor with a cavity disposed therebetween, wherein said compliant support structure changes size or shape during compression/expansion of said membrane, and wherein said compliant support structure comprises:
  a first wall;
  a first ring-like structure having an inner peripheral portion and an outer peripheral portion, one of said inner and outer peripheral portions of said first ring-like structure being built on said first wall;
  a second wall built on the other of said inner and outer peripheral portions of said first ring-like structure;
  a second ring-like structure overlying said first ring-like structure and having an inner peripheral portion and an outer peripheral portion, one of said inner and outer peripheral portions of said second ring-like structure being built on said second wall; and
  a third wall built on the other of said inner and outer peripheral portions of said second ring-like structure and connected to said membrane.

* * * * *